Figure 1:
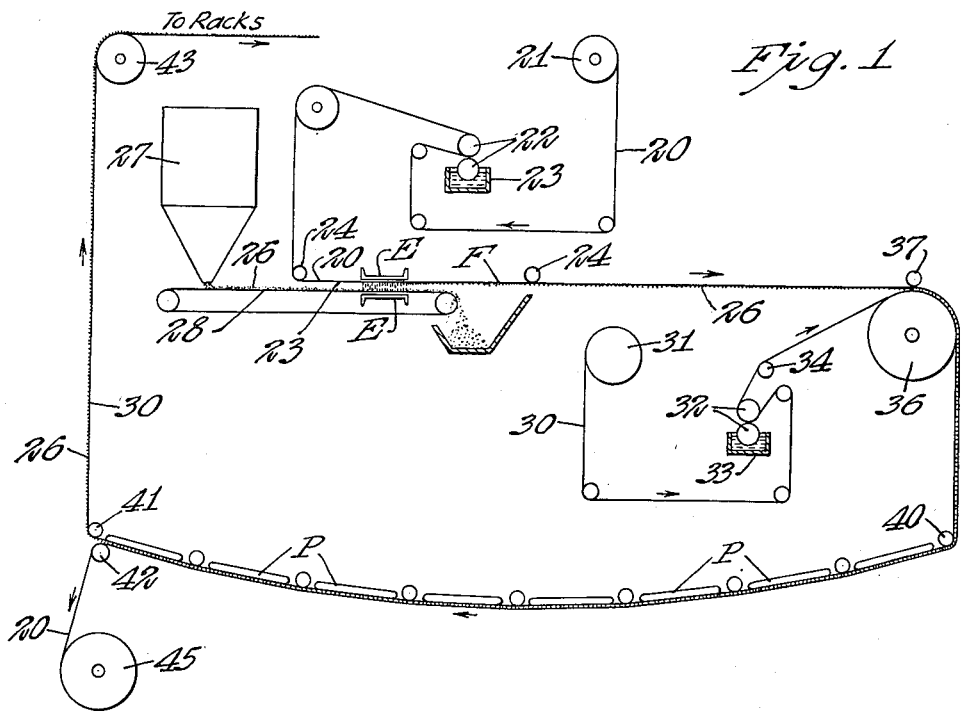

Nov. 3, 1953  B. S. CROSS ET AL  2,658,007
TRANSFER COATING
Original Filed Aug. 10, 1948  3 Sheets--Sheet 2
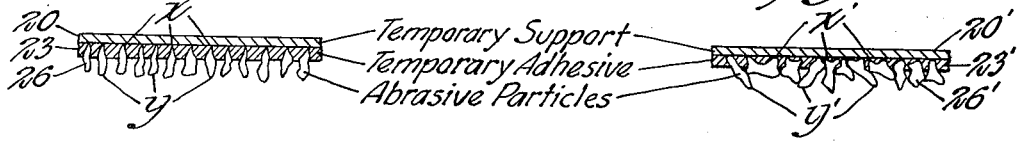
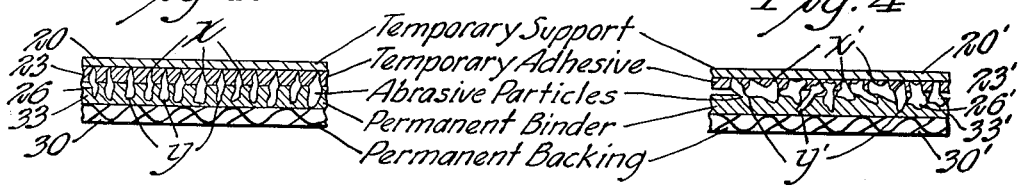
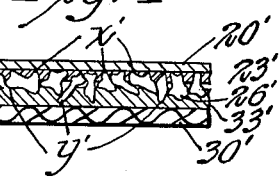
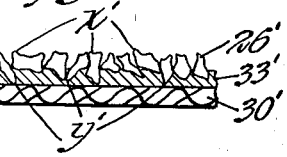
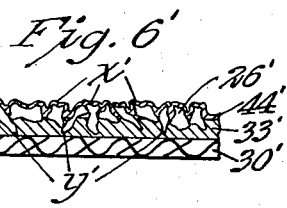
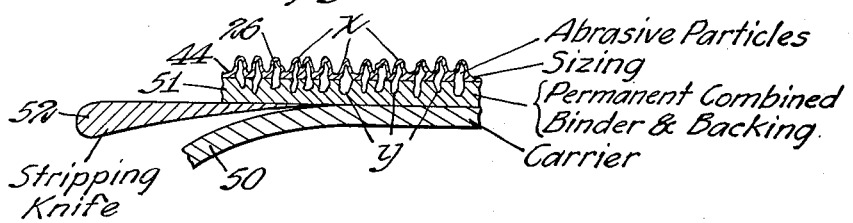
Inventors
Bert S. Cross
George P. Netherly
By
Carpenter Abbott Coulter & Kinney
Attorneys Nov. 3, 1953     B. S. CROSS ET AL     2,658,007
TRANSFER COATING Original Filed Aug. 10, 1948     3 Sheets-Sheet 3

*Fig. 8*
120 — Temporary Support
123 — Temporary Adhesive
126 — Abrasive Particles

*Fig. 8'*
120'
123'
126'

*Fig. 9*
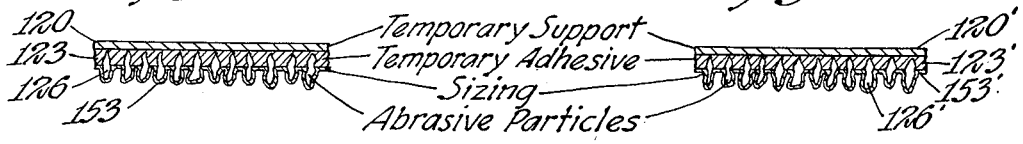
120 — Temporary Support
123 — Temporary Adhesive
126 — Sizing
153 — Abrasive Particles

*Fig. 9'*
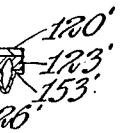
120'
123'
153'
126'

*Fig. 10*
120 — Temporary Support
123 — Temporary Adhesive
153 — Sizing
151 — Permanent Binder-Backing
126 — Permanent Binder
Permanent Backing

*Fig. 10'*
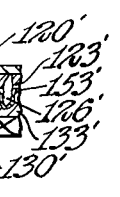
120'
123'
153'
126'
133'
130'

*Fig. 11*
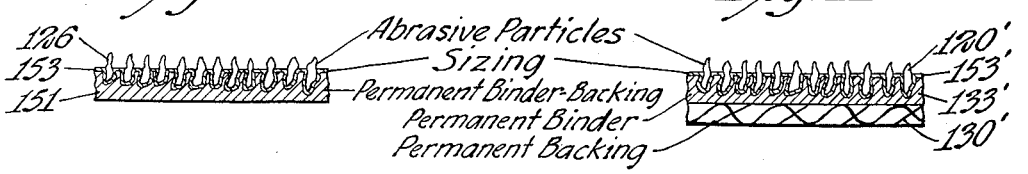
126 — Abrasive Particles
153 — Sizing
151 — Permanent Binder-Backing
Permanent Binder
Permanent Backing

*Fig. 11'*
120'
153'
133'
130'

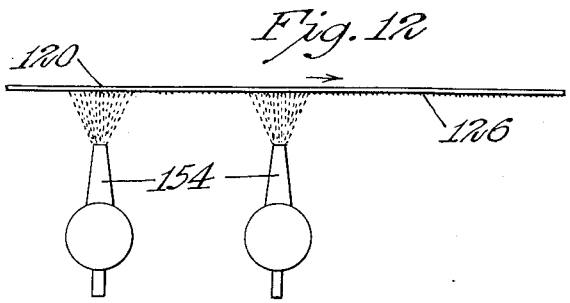

*Fig. 12*
120
154
126

Inventors
Bert S. Cross
George P. Netherly
By Carpenter Abbott Coulter & Kinney
Attorneys Patented Nov. 3, 1953

2,658,007

UNITED STATES PATENT OFFICE 2,658,007

TRANSFER COATING

Bert S. Cross, Bloomington Township, Hennepin County, and George P. Netherly, Afton Township, Washington County, Minn., assignors to Minnesota Mining & Manufacturing Company, St. Paul, Minn., a corporation of Delaware Original application August 10, 1948, Serial No. 43,528. Divided and this application June 22, 1950, Serial No. 169,756

8 Claims. (Cl. 117—17)

This invention relates to coatings of particulate matter of various kinds, such coatings comprising one or more layers of particles that are bonded to the object being coated. It relates especially to coatings on sheet material.

There are known methods in the coating art which cause particles to occupy a desired position at the moment of their deposition onto the article being coated, but usually some or all of the particles are subsequently moved by various causes during the making of the article so that by the time the article is completed, the desired positioning arrangement is frequently largely lost.

The present invention provides, inter alia, a method whereby each particle may be positively held in a precise predetermined position during its application to the article or object to be coated until the particle becomes fixed by the permanent binding means that is ultimately to be employed.

Such an exact fixation or holding of a particle in a desired location until the binding means has set has many advantages, e. g. it (1) permits the composite surface formed by the outer extremities of the particles to be given a predetermined contour, (2) permits the retention by the particles (e. g. elongate particles) of a desired orientation which may have been initially secured by one of various deposition processes, and (3) permits the production of adequately bonded particulate coated articles without the necessity of a "sizing coat," in a manner hereafter described.

Other advantages, and the applicability of the invention to fields other than abrasives, will be apparent.

Objects of the invention include:

The provision of steps in methods of forming particulate coated articles, by which each particle may be positively held in a predetermined position during its application to the article being coated until it becomes fixed in the binder;

The provision of a particulate coated article in which substantially all the particles occupy a definite predetermined position, and a method for producing the same;

The provision of a particulate coated article in which the composite outer surface formed by the extremities of the particles follows a predetermined contour, and a method for producing the same; and The provision of an adequately bonded particulate coated article without a sizing coat, and a method for producing the same.

These and other objects and advantages will appear from the specification taken as a whole.

Briefly, the invention provides securing the particles temporarily in a desired formation by adhering them to a temporary support, embedding them in the plastic or binder in which they are to be permanently held, maintaining the said formation and said embedment until the plastic or binder has set and then removing the temporary support, thereby providing a particulate coated article in which the particles occupy a precise predetermined position.

The specific articles that are described and illustrated in the following description and drawings as illustrative of this invention are sheeted abrasives such as are commonly called "sandpaper," and methods of making the same. The predetermined contour to which the composite surface formed by the extremities of the particles is made to conform, is here illustrated as being substantially planar, it being assumed that whenever the contour of the said surface is spoken of as being "planar," the backing is considered as being in a substantially planar position also.

Figure 2:
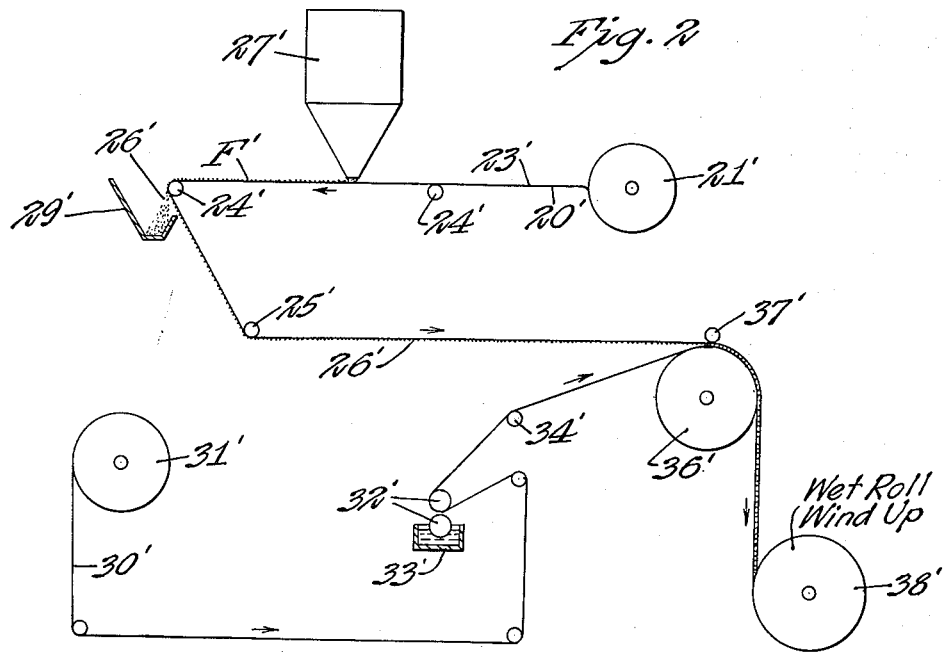

Figures 1, 2 and 12 are schematic diagrams of apparatus which may be used for carrying out methods according to this invention.

Figures 3 to 5, 7 to 11, 3' to 6' and 8' to 11', all inclusive, are vertical cross-sections of articles made according to this invention, taken at various stages during and after the process of their manufacture. The showing is simply illustrative; the dimensions are not in proportion and in certain cases are greatly exaggerated.

Referring to Figure 1, a mold or temporary support or "transfer sheet" in the form of a web 20 is led from a supply roll 21 around suitable guide rolls through adhesive applying rollers 22 which coat one side of the support with a layer of temporary adhesive 23. The support is then led around suitable guide rolls so as to form an approximately horizontal flight F between guide rolls 24—24 with the adhesive side 23 facing downwardly.

Particles 26 are deposited by gravity from a hopper 27 (which may be fitted with an adjustable gate or outlet, not shown, to control the quantity of particles that are released) onto the top of the upper flight of an approximately horizontal conveyor belt 28 which is positioned to conduct them below the flight F of the support 20. Means for depositing or projecting the particles onto the temporary support is provided in the form of two electrodes E—E, one above the flight F of the support 20 and the other below the upper flight of the conveyor belt 28, which, when connected to a suitable source of difference of potential (not shown) provide an electrostatic field whereby the particles 26 are propelled upwardly (and at the same time uniformly dispersed, and oriented) as known in the art (see the Carlton Patents Nos. 2,318,570-1), from the belt to the support 20 in such a manner that they penetrate and are held by, the temporary adhesive 23, as shown in Figure 3, with the uppermost or leading points x of substantially all of the particles either touching or closely adjacent to the molding surface of the support 20 so that said points follow the contour of said surface. Excess particles from the conveyor 28 may be caught by a suitable receptacle 29.

Meantime the web which is to form the permanent backing 30 is led from a supply roll 31 thereof around suitable guide rolls through binder applying rollers 32 which coat one side of the backing with a layer of permanent binder 33. The backing is then led around a guide roll 34 to a contact roll or combining drum 36 where the particle coated support 20 and the binder coated backing 30, preferably moving at substantially the same speed at the point of contact, are brought into contact with their coated sides facing each other (Figure 4). The angle at which they are brought together may be as great as is desirable to obviate difficulty from entrapment of air, the drawing being simply diagrammatic. For example the two webs may be at an angle of 135°–180° to each other and then, as they approach each other, they may be brought together in a fairly sharp arc. An adjustable pinch roll 37, positioned adjacent the combining drum 36, may be employed to help to press the support and backing together into their desired positional relationship whenever it is necessary to have such pressure in addition to the pressure which may be secured by leading the support and backing around the drum, the said desired positional relationship preferably being such that the ends y of the particles 26 extend sufficiently into the permanent binder 33 to permit adequate bonding, without a sizing coat, of the particles to the backing 30 upon completion of the final article, and such that the support and backing are substantially parallel, or such that when the backing is straightened into planar form, the adjacent molding surface of the support has the desired contour, which is planar in the illustrated embodiment. The preferred thickness of the temporary adhesive layer 23, from the point of view of the combining on drum 36, is often such that when the two webs are brought together in the above described positional relationship, the under surface of 23 will either touch or be very close to the top surface of the binder 33 so as to keep the binder from rising up along the sides of the particles 26 towards their tips x. It is preferable that the adhesive 23 be at this point sufficiently solidified and/or sufficiently immiscible with the binder 33 to prevent their commingling. This touching or approximate touching of the layers 23 and 33 is not always necessary, but whenever it is desired that the tips x be left uncovered in the finished article, the portion of the particles to be so left should be immersed or embedded in the adhesive 23 so as to keep the binder from climbing up over such portions by capillarity; and when the layers 23 and 33 actually meet, or meet approximately, then substantially all rising of the binder up the sides of the particles is prevented, thus providing the maximum space between the exposed portions of the particles in the ultimate product so as to provide maximum clearance and to prevent premature "filling" of the article when in use. However, the advantages of controlled orientation, controlled pattern of the exposed surface of the abrasive grits, and various other advantages of this invention can be secured even though a thinner temporary adhesive coat 23 is employed; in fact it is often desirable to forego the effect above discussed in favor of the combined advantages flowing from the use of a thinner temporary adhesive coat.

The support 20 and backing 30, after being thus joined at the combining drum 36, are led therefrom as a double web around a suitable series of guide rollers, including rollers 40, 41 and 42, and/or guide plates such as the plates P which are arranged to support the moving double web (while the binder 33 is setting) in a manner to minimize disturbance of the positional relationship of the particles, the support and the backing. At a point in the travel of the double web where the binder 33 will have acquired a preliminary set or hardness sufficient to enable it to retain the particles when the temporary support 20 and temporary adhesive 23 are stripped away, a stripping means (here shown as the guide roll or pull-over drum 42) is positioned adjacent the web, and the support 20 is led over it and wound on roll 45, thereby stripping the support with its layer of adhesive 23, away from the rest of the composite structure, leaving the particles 26 adequately bonded (upon final curing) to the permanent backing 30 by the binder 33 without any necessity for a sizing coat. All the particles in the finished article retain the even distribution and the orientation (e. g. parallel to each other and perpendicular or at a predetermined angle to the backing) originally supplied to them by the field E—E; all have their tips x free from any binder or sizing or other substance; and all the tips x lie in substantially the same plane and are exposed to form the abrading surface of the article being made, as shown in Figure 5. The backing 30, thus coated, is led away from the support 20 over the roll 41 and thence over additional rolls, such as 43, to suitable apparatus (not shown) for any final steps of curing or finishing that may be desired.

Referring now to Figure 2, which diagrams some of the alternative steps that may be employed according to the invention, a mold or temporary support or transfer sheet in the form of a web 20' which has been previously coated with a layer 23' of normally tacky adhesive, is led from a supply roll 21' over suitable guide rolls to form an approximately horizontal flight F' between guide rolls 24'—24' with the adhesive side facing upwardly.

Particles 26' are deposited by gravity from a hopper 27' (which may be fitted with an adjustable gate or outlet, not shown, to control the quantity of particles that are released) onto the flight F' so as to coat the support 20' with a layer of adhesively retained particles in such manner that the particles will penetrate, and be held by, the temporary adhesive 23', as shown in Figure 3', with the points x' of substantially all of the particles either touching or closely adjacent to the molding surface of the support 20' so that said points follow the contour of said surface. A trough 29' may be provided below the end of the flight F' to catch any excess particles which may fall. The support is then led around rolls 24' and 25' so that it approaches a contact roll or combining drum 36' with its coated side down, as indicated in Figure 3'.

Meantime the web which is to form the permanent backing 30' is led from a supply roll 31' thereof around suitable guide rolls through binder applying rolls 32' which coat one side of the backing with a layer of permanent binder 33'. The backing is then led around a guide roll 34' to the combining drum 36' where the particle coated support 20' and the binder coated backing 30', preferably moving in the same direction and at substantially the same speed at the time of contact, are brought into contact with their coated sides facing each other (Figure 4'). An adjustable pinch roll 37' is positioned and operates similarly to roll 37 in Figure 1.

The support 20' and backing 30', after being joined at the combining drum 36' with the ends $y'$ of the particles 26' extending into the binder 33' a distance sufficient to permit adequate bonding of the particles to the backing 30' upon completion of the final article, are led away from the drum as a double web to a wet roll wind-up 38'. Thereafter the roll 38' is removed and after the permanent binder 33' has hardened sufficiently to retain the particles when the temporary support 20' is removed, the roll is unwound and the said support is peeled off, leaving the particles 26' bonded to the permanent backing 30' by the binder 33' with their points $x'$ lying in substantially the same plane and exposed to form the abrading surface of the article being made, as shown in Figure 5'. The backing 30', thus coated, may then be given any further final steps of curng or finishing that may be required or desired, according to practices known to the art, such as the application of a sandsizing coat 44', if desired.

It will be apparent that in the various method steps and apparatus for carrying them out, there are many equivalents which may be interchanged and placed in various combinations without departing from the spirit of the invention.

For example, deposition of particles onto temporary supports such as 20 or 20' may be by any method regardless of the type of support or type of adhesive used thereon, even though only two methods are presently illustrated, i. e., Figure 1 shows a known species of electrostatic deposition whereby elongate particles are projected, uniformly dispersed, and oriented with their major axes parallel with each other and with the field's lines of force, and at a desired angle with the backing (substantially a right angle in the present illustration); and Figure 2 shows a species of gravity deposition. In the said species of electrostatic deposition shown in Figure 1, where the particles are in a lying-down position when they begin their upward journey from the belt 28 to the support 20, we have discovered that a substantial majority of the particles travel with their sharper points uppermost. This is thought to be due in part, at least, to the fact that the sharper or lighter weight end of a particle will respond more quickly to the field E—E and begin to rise before the heavy end rises. In the coated abrasive field, this invention therefore has especial utility where the illustrated electrostatic method is employed for it positions the sharpest ends outermost in the finished coated abrasive article and assembles in one plane the thus selected fine points, whereas heretofore neither of these effects was secured.

Treatment or curing of the double web (formed by the joining together of the temporary support and the backing by a combining means such as the combining drums 36 or 36') may also vary so long as the particles are held undisturbed in their desired ultimate position in the permanent binder. In Figure 2 the wet roll wind-up 38' is shown as being employed when the temporary adhesive 23' that is used is of the normally tacky type, but it may be used where adhesive 23' is of other types. Conversely, the manner of curing the double web shown in Figure 1 may be employed where the temporary adhesive 23 is of the normally tacky type. Partial drying of the permanent binder 33 or 33', preliminary to removing the temporary support 20 or 20', may be by simple drying, e. g. by heat or by other suitable means.

Employment of the invention in a manner to eliminate the necessity for sizing the particulate coated surface of the ultimate article is shown in connection with the illustration of Figure 1, but it may be used in connection with the other steps and with various combinations thereof.

Removal of the temporary support is usually by the simple mechanical peeling or stripping above described, but wherever the materials permit, if desired it may be by soaking, steaming, or dissolving either the support or the temporary adhesive or both, by solvents incompatible with the permanent binder, or by any other practicable method, as long as the particles are undisturbed in their desired formation, even including the burning off or destruction of the temporary support. Removal need not take place until after final curing of the ultimate article, if desired. In fact, it is frequently advantageous to postpone removal of the temporary support 20 or 20' until the time of actual use of the article by the ultimate consumer, in which case it serves as a protective "liner" to preserve the original nicety of the composite particulate surface during curing, cutting, storing, shipping, etc. Also the temporary adhesive 23 or 23' may be left on (with or without the temporary support 20 or 20') particularly when its composition is such as to serve a useful purpose thereby. For example, a temporary adhesive such as paraffin may serve as a lubricant in certain abrading operations (when the article being made is a form of sandpaper such as abrasive discs or belts).

Variance of the distance of travel of the permanent backing 30 or 30' between the binder applying rolls 32 or 32' and the combining drum 36 or 36' or variance of the treatment to which it is subjected or other means may be employed to give the particular permanent binder 33 or 33' being used a desired consistency at the time of its contact with the particles 26 or 26', its consistency being preferably such that it will receive and retain the particles in the position determined by the mold or support 20 or 20' without disturbance of said position by any action of the binder, such as resistance to penetration due to excessive viscosity, hardness, etc.

The temporary support or transfer sheet 20 or 20' may be of any suitable material, such as paper, sheet metal and other materials. It is preferable that the surface of the support be hard and smooth, to facilitate the even coating of a uniform layer of adhesive 23 or 23', and to prevent easy penetration of the support by particles, so as to permit repeated use of the same support. The surface of porous papers may be rendered hard and smooth by impregnation and/or coating with suitable agents such as resins.

The temporary adhesive and the permanent binder are commonly different with respect to each other and may be of any suitable types, but they are preferably selected with regard to their comparative properties in respect to the conditions or treatment to which they will be subjected to secure separation of the double web (i. e. removal of the temporary support and temporary adhesive from the particulate coated permanent backing), it being preferable that such conditions or treatment not be such as would disturb the particles in any manner, as by softening the permanent binder, for example.

An example of a type of temporary adhesive that may be used is a normally tacky or pressure-sensitive type, e. g., such as that used to provide the adhesive films or coatings of various adhesive tapes made and sold by Minnesota Mining and Manufacturing Company under the trade-mark "Scotch," characterized by being more strongly cohesive than adhesive so that objects (such as the particles 26 or 26') which adhere to it can be separated therefrom without withdrawing the adhesive with them. The employment of such an adhesive as the temporary adhesive permits the removal of itself and the mold or temporary support from the particulate coated permanent backing by simple mechanical stripping or peeling. Normally tacky adhesives which normally remain somewhat fluid may also be used, provided they are sufficiently viscous and/or adhesive to hold the particles in a desired position.

Another example of a temporary adhesive that may be used is the type of adhesive that hardens or loses its tackiness when used, such as glue, resin, starch, dextrin, silicate cement, etc., in which case it is preferably one that hardens or is treated to harden, more slowly than the permanent binder 33 or 33' and/or one that is soluble in solvents which are incompatible with the binder so it can be washed or soaked loose from the tips $x$ or $x'$. In case the temporary adhesive is of such character that it cannot readily be stripped from the permanent binder and solid particles by the use of solvent, heat-softening or like expedients, then in some cases it is simply removed by stripping with sufficient mechanical force, but in this latter event it is quite desirable, if not imperative, for the permanent binder to be of such character in respect to the temporary adhesive that it does not "wet" it or become tightly bonded to it.

The use of a plasticized glue as the temporary adhesive (such as glue mixed with glycerine in equal parts by weight), which softens upon an increase in humidity, in conjunction with a permanent binder that is not softened by the degree of humidity that will soften the plasticized glue, permits the removal of itself and the temporary backing from the particles by passing the double web through an atmosphere sufficiently humid to soften it.

A temporary adhesive which has a low melting point or which thins rapidly upon being subjected to mild heat, e. g. syrup, wax, paraffin, etc., permits the removal of itself and the temporary support or mold simply by heating the double web.

The layer of temporary adhesive preferably should be relatively thin, compared with the depth of the layer of permanent binder, so as to leave the largest possible portion of the $y$ ends of the particles exposed for embedment in the permanent binder 33—33', and so as to permit the ends $x$ or $x'$ to extend all the way through the layer 23 or 23' to the support 20 or 20', thereby aligning said ends in a more nearly precise conformity with the planar contour of the molding surface of the support. At the same time the layer 23 or 23' should be of sufficiently heavy consistency or viscosity to hold the particles in their desired position, particularly when they are oriented in a particular manner, as by electrostatic deposition, and of sufficient depth or thickness to cover that portion of the particle that is to remain uncoated upon completion of the ultimate article.

However, some adhesives, due to properties such as degree of tack, surface-tension, etc., hold the particles adequately even though the particles do not penetrate the layer 23 or 23' of said adhesive, in which case the desired contour, such as the uniplanar arrangement of the points $x$ or $x'$, is secured by reason of their conformity to the outer surface of the adhesive layer 23 or 23'. Usually the molding surface of the transfer sheet 20 or 20' and the outer surface of the temporary adhesive 23 or 23' are parallel, in which case their contours are the same; but sometimes they are not parallel and their contours differ, in which case particles that do not penetrate the layer 23 or 23' of the adhesive conform to the contour of the outer surface of said layer rather than the contour of the surface of the support 20 or 20'. Due to their extreme tackiness, or for other reasons, some adhesives may be spread in such a thin layer that the molding surface of 20 or 20' and the outer surface of the adhesive layer 23 or 23' are already in approximate coincidence, so that the position of a particle is substantially the same regardless of whether or not it penetrates through to the support.

Anchorage of particles to a support such as 20 without substantial penetration of the adhesive layer 23, as above described, is often sufficient, especially wherever the support does not change its directional relationship from the time of deposition of particles onto it until it is joined to the permanent backing 36, as, for example, in the method illustrated in Figure 1 where the support 20 is horizontal and faces downwardly all the way from the deposition zone E—E to the combining drum 36.

The temporary carrier 20 or 20' and/or the coating of temporary adhesive 23 or 23', may be embossed to present varying contours, such as ridged, corrugated, waffled, stepped, etc., contours, in place of the illustrated planar contour. For example the contour may be such as to provide a series of groups of alternate ridges and grooves, the said ridges and grooves of each group extending radially from a common center so that discs with radially grooved working faces may be stamped out from the ultimate coated product.

The permanent backing may be of any suitable type, including the combined backing and binder type in which a body portion serves as both binder and backing, which in the sandpaper art is sometimes referred to as "backless sandpaper." One method of making sandpaper without the conventional cloth or paper backing is described in Bartling and Overshiner Patent No. 2,220,140, issued November 5, 1940, but this does not produce a sandpaper having the characteristics and advantages of that produced in accordance with our present invention. In making the improved "backless" sandpaper of this invention, one method or procedure is to bring together and join the particulate coated temporary support 20 or 20' and a temporary web or "carrier" 50 coated with a layer 51 of plastic material in viscous, plastic state, the latter to serve in the ultimate sheeted product both as a binder for the particles and as a backing or body for the ultimate sheet as a whole. Removal of the ultimate sheeted product from the carrier 50, as by a stripping knife 52 (Figure 7), is preferably subsequent to the removal or stripping off of the temporary support 20 or 20', though the order may be reversed if desired. The plastic layer 51, thus coated with particles 26 with their points $x$ lying in substantially the same plane, may then be given any final steps of curing or finishing that may be required, according to practice known to the art, such as application of a sandsizing coat 44, if desired. A unique type of "backless" sandpaper is thus produced, with the exposed ends of the grits in planar relation, or forming a waffle or ridged effect, or any other desired surface contour. Sandpaper made this way need not be sandsized; although where sandsizing is desirable as a control on physical properties, it may be employed.

This invention finds additional utility in providing what might be termed an "inverse" method of making particulate coated articles, such as sandpaper, e. g. an article comprising a body portion of plastic material which serves as both binder and backing with a layer of particles embedded therein or bonded thereto. An example of such an article is sandpaper of the so-called "backless" type, just discussed; however it is also applicable to sandpaper or the like having a cloth, paper, etc., backing. This "inverse" method may be carried out by providing a temporary support 120, coating it in a suitable manner with a temporary adhesive 123 and depositing abrasive grains or other particles 126 thereon, so that they are embedded to the desired depth in adhesive layer 123. The coated article (Figure 8) thus formed may then be treated on its coated side with a sizing coat 153 (Figure 9). This initial application of the permanent bond may be made in any suitable manner, e. g. by being sprayed on in atomized form, as by one or more spray-nozzles 154 (Figure 12). After the setting or hardening of this initial bond coat or size, the permanent plastic layer or "binder-backing" 151 may then be applied over the initial bond coat 153 and particles 126 (Figure 10) in a suitable manner. It may be applied as a liquid (with the particles 126 on the top side of the sheet), or it may be applied in atomized form by suitable spraying means, represented herein by the nozzles 154 shown in Figure 12, or it may be applied by knife-coating or by a combination of spraying and knife-coating, or by other means known in the coating art. It is preferable that the sandsizing coat 153 be of such character in relation to the material of the permanent binder-backing 151 as to be substantially unsoftened and undissolved thereby, especially where the grits or particles 126 are on the top side of the web when the binder-backing layer 151 is applied. For example the sizing coat 153 may be a heat-convertible or non-thermoplastic synthetic material and the plastic layer 151 may be glue, polyvinyl alcohol, vinyl butyral resins, etc., or mixtures thereof, the coat 153 being hardened or cured before the application of layer 151 to avoid softening thereof or dislocation of the particles 126.

After the binder-backing 151 and/or the sizing 153 have set or hardened sufficiently to hold the particles 126 when the temporary support 120 and temporary adhesive 123 is removed, the said support and adhesive may then be removed, leaving an article comprising the particles 126 held by the sizing 153 and binder-backing 151 with the extremities of the particles, which were originally embedded in the temporary adhesive layer 123, exposed (Figure 11). The article may then be given any further final steps of curing or finishing that the nature of the materials used or the use to which the article is to be put, may make desirable, according to practices known to the art. For example, if the plastic layer 151 is water-soluble, it is sometimes desirable to give the finished sheet a treatment on the exposed surface of the layer 151 to render it water-resistant or water-repellent. Likewise the exposed surface of the sizing coat 153 may be given a treatment (with or without adding an additional coating) to render it more waterproof and/or more heat-proof, in the event this is desirable.

The result is a unique type of particulate coated article, e. g. of "backless" sandpaper.

Except for the formation of the permanent binder-backing 151, the apparatus, process, materials, variables, alternatives and equivalents for making the product of Figure 11 may be generally the same as in the disclosure made herein in connection with Figures 1 to 5 and 3' to 6'. For example, in producing the temporarily coated support shown in Figure 8, the materials that may be used as the temporary support 120 and the temperorary adhesive 123, the treatment and handling thereof, and the manner of the deposition and positioning of the particles 126, may all be as hereinabove described for making the coated support shown in Figures 3 and 3'.

The sizing coat 153 often may be omitted, but it is desirable under many conditions. For example, it is desirable when the viscosity or composition of the binder-backing 151 is such as to disturb the particles, as by capillary action or by softening the temporary adhesive 123, or when the binder-backing layer 151 is being applied by knife-coating.

A sizing coat may be similarly employed on the temporary support in the process of making a particulate coated product whose permanent binder and backing are originally separate, as described for example in connection with Figures 1 to 5 and 3' to 5'. For example, a relatively hard-surfaced smooth temporary support 120' coated with a temporary adhesive 123' and a layer of particles 126' (Figure 8') may have a coating of sizing 153' (Figure 9') applied to it by atomizers or spray nozzles 154, following which a permanent backing 130' coated with a permanent binder 133' is brought into contact with the particulate coated support 120' (Figure 10') until the permanent binder and/or sizing has set sufficiently to hold the particles upon removal of the support, whereupon the support 120', with its adhesive 123', is removed, leaving the article of Figure 11'. The apparatus, process, materials, variables, alternatives and equivalents for making the product of Figure 11' may be generally the same as in the disclosure made herein in connection with Figures 1 to 5 and 3' to 6'.

The sizing coats 153 and 153' may be suitably treated by air, heat, etc. to produce any desired degree of hardness before permitting them to contact the permanent binder-backing or binder, respectively, and they may be of any suitable material, having regard to its compatibility with the other materials that it contacts, i. e. the temporary adhesive 120 or 120' and the binder-backing 151 or binder 133', and having regard to the comparative properties of the various materials in respect to the conditions or treatment to which they will be subjected during the process, such as disclosed in Netherly et al. Patent No. 2,269,415.

After particles have been applied to a temporary support, as in Figures 3, 3', 8 and 8', for example, they may be coated (as by spraying) with a "wetting" agent to facilitate their immersion in the permanent binder. The above described sizing coats 153 and 153' may be of materials that will serve as such wetting agents, or a wetting agent coat may be added over the said sizing coat. An example of such a wetting agent, where the permanent binder is a phenol-formaldehyde resin, may be furfural.

The application of the plastic binder-backing layer 151 is illustrated herein as being made when the particulate coated side of the support 120 faces downwardly, but it will be obvious that the said application, whether by knife-coating, by flowing the same on as a liquid, by spraying or by other means, may be made when the coated side of the support faces upwardly or in any other direction, so long as due provision is made (as above indicated) to avoid dislocation of the particles 126 and 126'. The same is true of the application of the sizing coats 153 and 153' to the particulate coated sides of the temporary supports 120 and 120', respectively.

It will be noted that in the ultimate finished product, such as the products shown in Figures 11 and 11', the above described sizing layers 153 and 153' are not the heretofore known conventional sizing coats that customarily overlie the outer particulate coated surface of the article (such as the sizing coats 44 and 44' in Figures 7 and 6', respectively. Instead, they underlie the particles. Consequently, the type of sizing exemplified by the layers 153 and 153' is sometimes referred to as "inverse sizing."

The invention also finds utility in applying particles to objects which, because of their size or shape or location or for other reasons, can more advantageously be coated by our procedure than by the methods and/or apparatus heretofore designed to coat objects with particles. A temporary support, such as 20, 20', 120 or 120', coated with particles that are held thereto by a temporary adhesive as in Figures 3 or 3', or by a temporary adhesive plus a sizing as in Figures 9 or 9', may be removed from the coating apparatus as a novel intermediate product and transported (or stored in rolls and then transported subsequently) to the base to which the particles are to be permanently adhered. The base then may be coated with a suitable permanent binder, the temporary support brought adjacent to it so that the particles extend into the permanent binder; then the temporary support and adhesive may be removed after the permanent binder has set sufficiently to retain the particles upon removal of the support. An example of a base which may conveniently be thus coated is a floor of a building or the deck of a ship, on or in which a layer of particles is to be adhered or embedded to form a non-slip tread. Also this principle may be employed in transplanting or transferring other particles where a precise or close control of the contour of finished particulate coated surfaces, or of the extent of protrusion of the particles, is desired.

It will be seen that this invention provides a novel method of great utility that finds a wide variety of uses in many phases of the coating art, and especially in the coated abrasive art, the bead coating art, and the like; that it provides new kinds of particulate coated articles; that it provides particulate coated articles of good clearance that are adequately bonded even though unsized; that it makes placement of particles in a predetermined position a certainty; and that it provides positive predetermination of contour of particulate coated particles, even when the particles are non-uniform as to size and/or shape. It is therefore of particular utility in the coated abrasive field where the particles are unavoidably non-uniform; but, although sandpaper and methods of making it are described and illustrated herein and although the predetermined contour to which the extremities of the surface-forming particles are made to conform, is shown herein as being planar, it is to be understood that these embodiments are merely illustrative of the present invention and that the invention may also be embodied in highly useful articles that are coated with particles other than abrasive particles, such as particles or beads of glass, stone, metal, flock, cork, mineral, roofing granules, etc., and that the said contour may be other than planar.

Hereinabove various combinations of temporary adhesives and permanent binders are discussed or contemplated, for example, (1) tanned animal glue as a temporary adhesive and untanned animal glue as the permanent binder, (2) a pressure-sensitive rubber adhesive as the temporary adhesive and animal glue, alkyd resin or the like as the permanent binder, (3) animal glue as the temporary adhesive and a phenol aldehyde resin as the permanent binder. These and the other combinations of temporary adhesive and of permanent binder set out above are only illustrative, however, and various other combinations and specific choices of materials are, of course, contemplated.

The word "support" as used herein refers to the sheeted member to which the particles are temporarily adhered (such as the sheet 20 in Figures 3 and 4).

The word "carrier" on the other hand, refers to the sheeted member that temporarily carries the layer of plastic material which serves as both binder and backing (such as the sheet 50 in Figure 7 that carries the plastic layer 51).

The word "backing" refers to the permanent backing or base to which the particles are ultimately adhered or bonded in the finished article (such as the sheet 30 in Figures 4 and 5).

The word "adhesive" refers to the material used for temporarily adhering the particles to each other and to the temporary support (such as the layer 23 in Figures 3 and 4).

The word "binder" on the other hand, refers to the material used for permanently adhering the particles to each other and to the permanent backing (such as the layer 33 in Figures 4 and 5).

The word "backless" is sometimes used herein as a conveniently brief means of designating a type of particulate coated sheet which, instead of having a conventional backing such as paper or cloth, has as a backing a plastic layer that serves both as a binder for the particles and as a backing for the sheet as a whole. An examples of such a plastic layer is the layer 51 in Figure 7; it is sometimes referred to herein as a "combined binder and backing" or as a "binder-backing."

This is a division of our copending application Serial No. 43,528 which was filed August 10, 1948, as a continuation of our application Serial No. 510,010 filed November 12, 1943, the latter being now abandoned. The application Serial No. 43,528 issued on April 17, 1951, as Patent No. 2,548,872.

Certain phases of this disclosure including the above described inverse method of making particulate coated articles, are claimed in our co-pending application Serial No. 34,804 filed June 23, 1948, which issued on September 11, 1951, as Patent No. 2,567,186.

We claim:

1. In a method of making a particulate coated sheet that comprises a plastic layer which serves both as a binder for the particles and as a backing for the sheet as a whole, the steps comprising coating a sheeted temporary support with a layer of temporary adhesive, depositing particles thereon so that they are substantially all held by the adhesive with their adhesive-contacting extremities collectively conforming to the contour of the adhesive coated surface of the support and with their opposite extremities extending outwardly from the adhesive coated support, applying a sizing coat to the particle-coated side of the sheeted temporary support, applying a layer of a plastic material in viscous, plastic state over the sizing coat, positioning the support so that the desired contour of the adhesive coated support is maintained and maintaining the support in said position until the sizing and the plastic material have set sufficiently to hold the particles fixed upon removal of the support and adhesive, and then removing the support and adhesive, leaving the particles held by the plastic layer and the sizing with the extremities of the particles which originally contacted and were embedded in the said temporary adhesive exposed to form a surface having a contour complementary to that of the support.

2. In a method of making a particulate coated sheet that comprises a plastic layer which serves both as a binder for the particles and as a backing for the sheet as a whole, the steps comprising applying a coating of temporary adhesive to a surface of a sheeted temporary support, propelling the support longitudinally, applying particles thereto so that they are substantially all held by the adhesive with their adhesive-contacting portions collectively conforming to the contour of the adhesive coated surface of the support and with their opposite portions extending outwardly from the support and protruding from the layer of temporary adhesive, coating a temporary sheeted carrier with a layer of a plastic material in viscous, plastic state, propelling the carrier longitudinally with its coated surface facing the coated surface of the support, directing the support and the carrier to move in unison adjacent each other so that the support and carrier are temporarily united to form a double web with the adhesive coated surface of the support maintaining a desired contour, the adhesive-contacting portions of the particles collectively conforming to the said contour and the opposite portions of the particles penetrating the plastic material, maintaining the support, carrier and particles in the said positional relationship until the plastic material has set sufficiently to hold the particles fixed upon removal of the support and adhesive, peeling off the support and adhesive, thereby leaving the particles held by the plastic layer with the portions of the particles which originally contacted the adhesive exposed to form a composite surface complementary to that of the support, and then stripping the thus particulate coated plastic layer from the carrier.

3. In a method of making a particulate coated sheet that comprises a plastic layer which serves both as a binder for the particles and as a backing for the sheet as a whole, the steps comprising applying a coating of temporary adhesive to a surface of a sheeted temporary support, propelling the support longitudinally, applying particles thereto so that they are substantially all held by the adhesive with their adhesive-contacting portions collectively conforming to the contour of the adhesive coated surface of the support and with their opposite portions extending outwardly from the support and protruding from the layer of temporary adhesive, coating a temporary sheeted carrier with a layer of a plastic material in viscous, plastic state, propelling the carrier longitudinally with its coated surface facing the coated surface of the support, directing the support and the carrier to move in unison adjacent each other so that the support and carrier are temporarily united to form a double web with the adhesive coated surface of the support maintaining a desired contour, the adhesive-contacting portions of the particles collectively conforming to the said contour and the opposite portions of the particles penetrating the plastic material, maintaining the support, carrier and particles in the said positional relationship until the plastic material has set sufficiently to hold the particles fixed upon removal of the support and adhesive, stripping the plastic layer from the carrier, and then peeling off the support and adhesive, leaving the particles held by the plastic layer with the portions of the particles which originally contacted the adhesive exposed to form a composite surface complementary to that of the support.

4. The method of claim 1 in which the particles are elongate and in which they are deposited on and embedded lengthwise in the adhesive of the temporary support by passage of an electrical field through the particles as they are so deposited.

5. The method of claim 2 in which the particles are elongate and in which they are applied to and embedded lengthwise in the adhesive of the temporary support by passage of an electrical field through the particles as they are so applied.

6. The method of claim 3 in which the particles are elongate and in which they are applied to and embedded lengthwise in the adhesive of the temporary support by passage of an electrical field through the particles as they are so applied.

7. The method of claim 2 further characterized by the addition of the intermediate step of applying a sizing coat to the particulate coated side of the temporary support before uniting the support and the carrier.

8. The method of claim 3 further characterized by the addition of the intermediate step of applying a sizing coat to the particulate coated side of the temporary support before uniting the support and the carrier.

BERT S. CROSS.
GEORGE P. NETHERLY.

References Cited in the file of this patent

UNITED STATES PATENTS

| Number | Name | Date |
|---|---|---|
| 1,854,071 | Schacht | Apr. 12, 1932 |
| 2,015,658 | Bezzenberger | Oct. 1, 1935 |
| 2,143,636 | Tone | Jan. 10, 1939 |
| 2,183,520 | Van Derhoef | Dec. 19, 1939 |
| 2,220,140 | Bartling | Nov. 5, 1940 |
| 2,548,872 | Cross | Apr. 17, 1951 |
| 2,567,186 | Cross | Sept. 11, 1951 |